Patented Sept. 7, 1954

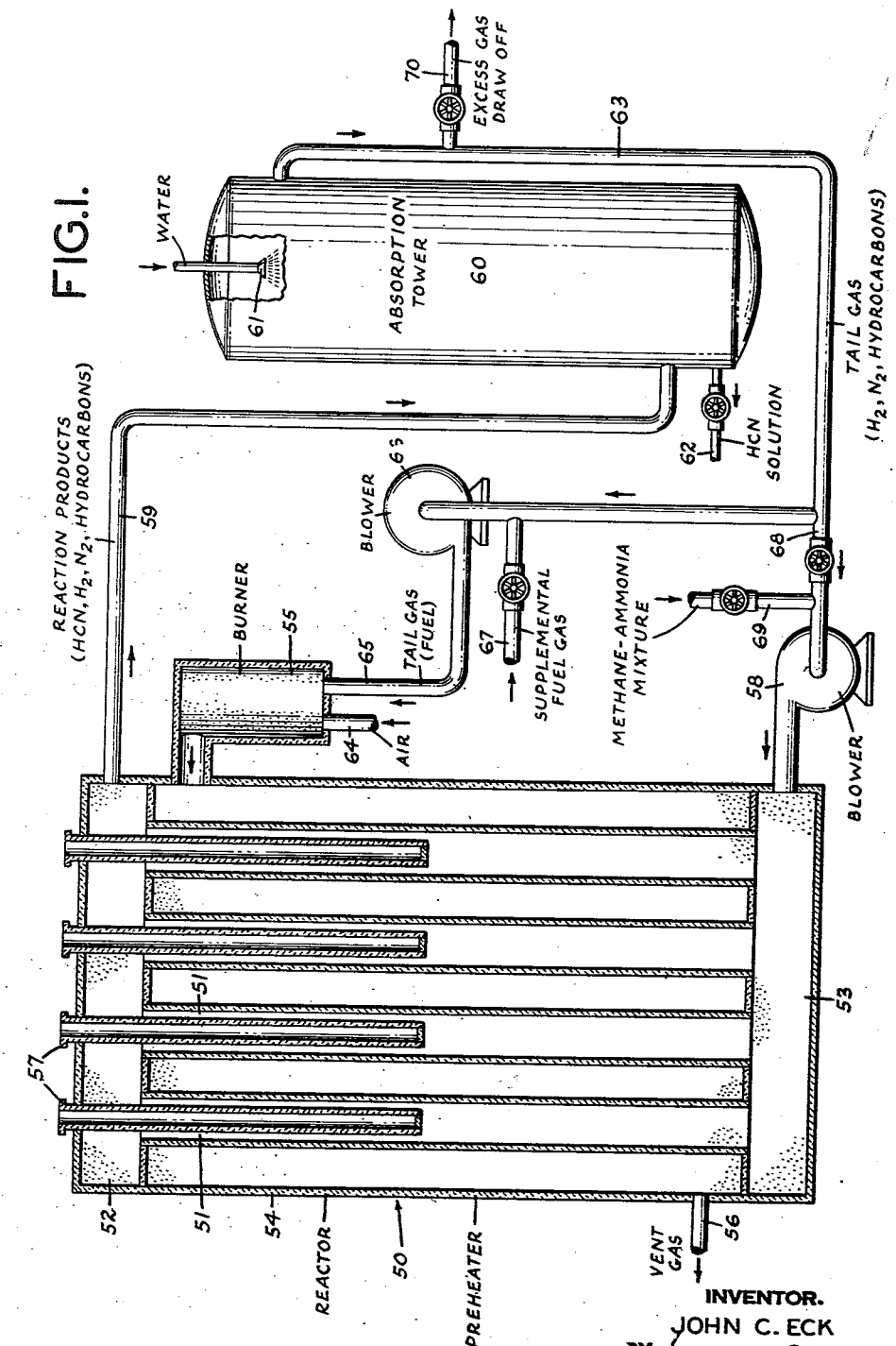

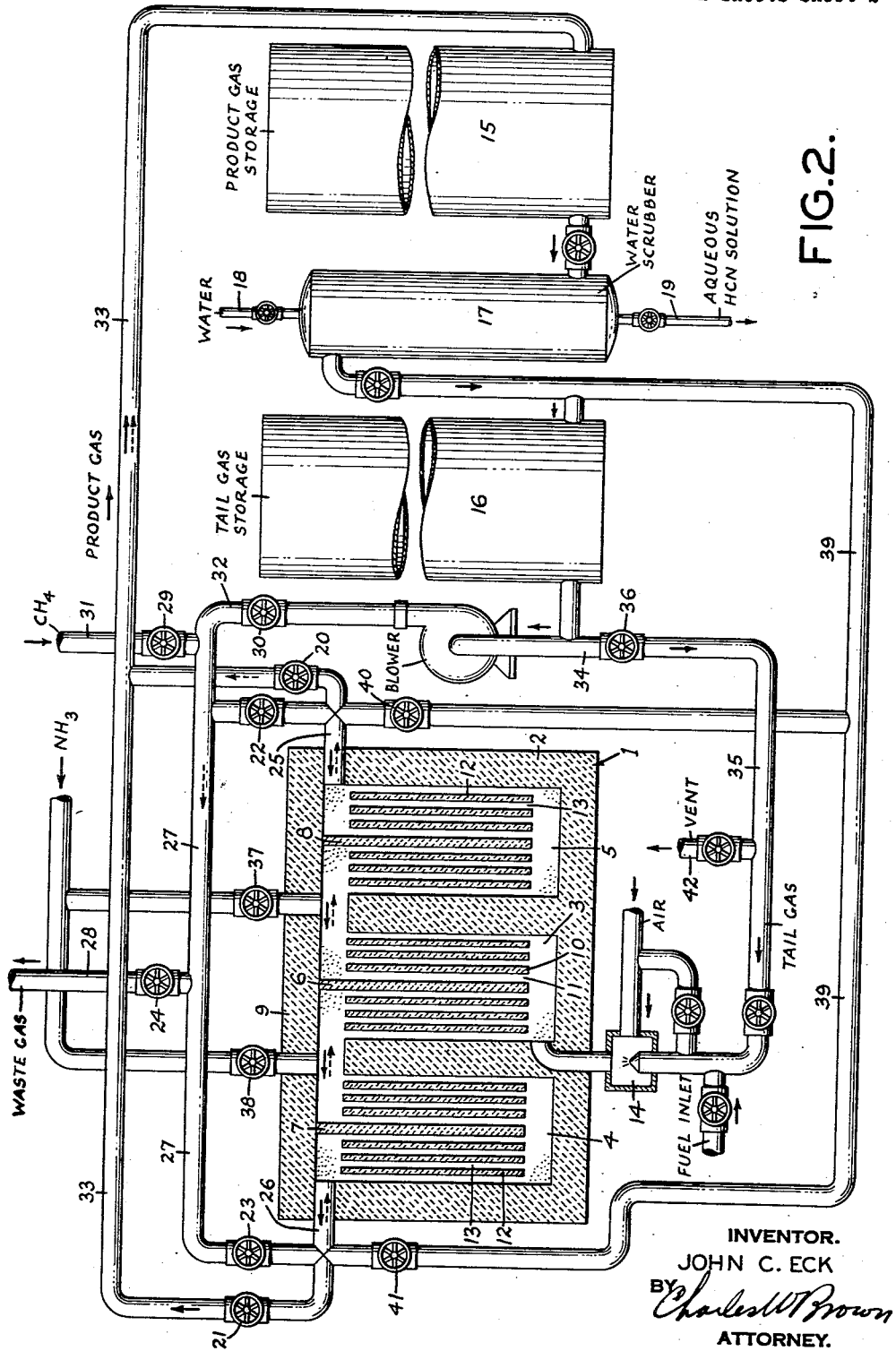

2,688,531

UNITED STATES PATENT OFFICE 2,688,531

PRODUCTION OF HYDROCYANIC ACID

John C. Eck, Convent, N. J., assignor to Allied Chemical & Dye Corporation, New York, N. Y., a corporation of New York Application April 22, 1950, Serial No. 157,481

1 Claim. (Cl. 23—151)

This invention relates to the production of hydrocyanic acid by reaction of methane and ammonia.

It is known that various hydrocarbons, including methane, when heated with ammonia react to form hydrocyanic acid. It has been proposed to heat the ammonia and hydrocarbon to high temperatures for a short period of time while passing through a reaction chamber of refractory material which is not regarded as an active catalyst in promoting the reaction of the ammonia and hydrocarbon. This type of process is known, and referred to herein, as a non-catalytic process, and it is to an improvement in that type of process to which my invention is directed.

I have discovered that in a non-catalytic process for reacting methane and ammonia to form hydrocyanic acid, the addition of hydrogen or nitrogen to the reaction mixture in certain ratios of these added gases to the ammonia present in the reaction mixture, materially increases the yields of hydrocyanic acid when other conditions for carrying out the reaction, temperature, time and ratio of methane to ammonia in the reaction gases, are maintained within certain limits. I have discovered that when all of these conditions are maintained within certain limits, practically complete decomposition of the ammonia may be obtained with high yields of hydrocyanic acid, 80 mol percent or better (based on the ammonia in the reactant or inlet gas) when the inlet gas consists of a mixture of methane, ammonia and hydrogen or nitrogen or both of the latter gases. If limited amounts of air are also incorporated in the gas mixture to supply heat for the reaction by combustion of a part of the methane and to supply nitrogen for dilution of the reaction mixture, yields of hydrocyanic acid but little below those when no air is supplied are also obtainable.

Substantially complete decomposition of the ammonia in heating it with methane to form hydrocyanic acid is desirable from the viewpoint of simplifying the recovery of the hydrocyanic acid and obviating the need for recovering ammonia (the more expensive of the two reactants) from the product gases for recycling in the process. If the hydrogen cyanide is recovered by washing the product gases with water or by refrigerating them to condense liquid hydrocyanic acid, ammonia present in the gases reacts with hydrocyanic acid to form ammonium cyanide. To recover the hydrogen cyanide thus combined with the ammonia an acid, such as sulfuric acid, must be employed to decompose the ammonium cyanide into ammonium sulfate and evolve the hydrocyanic acid. But this increases the processing costs and requires the use of an additional chemical. If the hydrogen cyanide is recovered as sodium cyanide by absorption from the product gases in caustic soda solution, despite an expectation that ammonia would not be taken up by this solution, I have found that ammonia is in fact absorbed in washing the gases with caustic soda solution. In a process in which a substantial portion of the ammonia is undecomposed under conditions employed for the reaction of the methane and ammonia, the costs of the process are substantially increased either by the loss of ammonia absorbed in the caustic soda solution or by the expense required for recovering the ammonia.

While it is highly desirable, therefore, to obtain complete decomposition of the ammonia in heating it with methane to form hydrocyanic acid, the yield of hydrocyanic acid must not be sacrificed, otherwise the process becomes inefficient. The conditions for reacting the methane and ammonia which characterize the process of my invention not only result in no sacrifice in yield of HCN to obtain practically complete (greater than 95%) decomposition of the ammonia, but result in yields of hydrocyanic acid even greater than those obtainable by processes heretofore known.

My invention is characterized by heating a reaction mixture of methane and ammonia in the absence of a catalyst and under the following conditions:

(1) The reaction mixture contains substantially 2 to 9 volumes of hydrogen or nitrogen or of a mixture of these two gases for every 1 volume of ammonia; and (2) 1.3 to 3.0 volumes of methane for every 1 volume of ammonia;

(3) The reaction mixture is heated to temperatures of at least 1375° C., preferably 1375° to 1600° C.; and (4) Is heated at temperatures above 1200° C. for a period of substantially 0.15 to 0.3 second; and (5) When air or other oxygen gas is included in the reaction mixture, no more than 1 volume of oxygen is employed for every 1 volume of ammonia and 1 volume of methane for every 1.5 volumes of oxygen in the air in addition to the methane required to provide the methane to ammonia ratio specified in (2) above. In this process naturally occurring air and oxygen-enriched air, prepared either by addition of oxygen to or removal of part of the nitrogen from naturally occurring air, are equivalents when used in amounts supplying a given quantity of oxygen, and hydrogen or nitrogen is added to the reaction mixture, if necessary, to provide the required amount of these diluents.

Preferred conditions for carrying out my process are heating a reaction mixture containing 2 to 5 volumes nitrogen or hydrogen or a mixture of the two for every 1 volume of ammonia and 1.5 to 3 volumes of methane for reaction with every 1 volume of ammonia, to a temperature in the range 1375° C. to 1500° C. for a reaction period of 0.15 to 0.3 second at temperatures above 1200° C.

In explanation of the foregoing conditions under which my process is carried out, the ratios of hydrogen or nitrogen, of methane and of air to ammonia are for the initial reaction mixture. The reaction time is calculated on the basis of the volume of reaction mixture passed to the high temperature reaction zone and the volume of gas space in the zone where the stated reaction temperatures prevail. The following equation gives this reaction time:

$$\frac{3600}{\left(\frac{Vg}{Vr} \times \frac{(T+273)}{273} \times \frac{760}{P}\right)}$$

where $Vg$ = the volume of inlet gas per hour, at STP
$Vr$ = the volume of gas space in the reaction zone
$T$ = the mean temperature (in degrees centigrade) in the reaction zone where the gas is at temperatures above 1200° C.
$P$ = the pressure (in millimeters) in the reaction zone The temperatures are those measured by a pyrometer in the gas space in the reaction zone.

The methane may be supplied to my process as a gas in which the methane constitutes substantially the whole of the hydrocarbon content, as in the case of a concentrated methane gas or some natural gases. However, other hydrocarbons heavier than methane may be present in small proportions to the methane. When such heavier hydrocarbons are present in minor amounts, they also undergo reaction with ammonia to form hydrocyanic acid and are equivalents of methane, one volume of a heavier hydrocarbon being equivalent to one volume of methane multiplied by the number of carbon atoms in the molecule of the heavier hydrocarbon; e. g., one volume of ethane is the equivalent of two volumes of methane.

The hydrocyanic acid in the gases leaving the reaction zone may be recovered therefrom by scrubbing the reaction products with an absorbent. When the absorbent is an aqueous caustic soda solution the hydrocyanic acid reacts with the caustic soda to form sodium cyanide which may then be recovered from the solution. When it is desired to recover the hydrocyanic acid as such, it is preferred to scrub the product gases with a countercurrent flow of cold water. The resulting solution may then be heated to evolve the hydrocyanic acid as a gas which is condensed by cooling. The condensate may be fractionally distilled to recover a purified hydrocyanic acid product.

Whether the hydrocyanic acid is absorbed from the product gases by caustic soda solution or water, the unabsorbed tail gas principally consists of unreacted methane, hydrogen and nitrogen. Small amounts of hydrocarbons other than methane are present. When air is added to the reaction mixture and water is used as the absorbent, oxides of carbon are also present in substantial amounts. This tail gas may be recycled with ammonia and methane addition thereto to prepare the reaction mixture heated to form hydrocyanic acid. In such a recycle process the diluent will be chiefly hydrogen with smaller amounts of nitrogen, the two serving as these diluents in the reaction mixture. The excess of tail gas over that recycled to provide the desired amount of diluent in the reaction mixture may be burned to provide heat for the process. An advantageous mode of operation involves employing recycled tail gas as the diluent for the reaction mixture and burning the excess tail gas over that required for diluting the reaction mixture, and any additional combustible material required to supply the heat for the process, in a furnace to supply heat to a high temperature reactor in which the methane and ammonia are reacted to form hydrocyanic acid.

The following examples are illustrative of specific methods for carrying out my invention and further describe that invention:

*Example 1.*—A refractory tube of alundum having an internal diameter of 22 mm. is fitted with an alundum thermocouple well having an external diameter of 17 mm., and is heated in a furnace. Through the annular space between the exterior of the thermocouple well and the interior surface of the alundum tube a mixture of ammonia, methane and nitrogen in the volumetric ratio of 2.64/5.75/1 of $CH_4/N_2/NH_3$ is passed. The reaction mixture is heated up to a maximum temperature of 1450° C. while passing through the tube at a rate such as to give a reaction time of 0.18 second in the portion of the tube where the reaction mixture is at temperatures above 1200° C.

Under these conditions there is substantially no undecomposed ammonia in the product gases and more than 85% of the inlet ammonia is converted to hydrocyanic acid.

Decreasing the methane to ammonia ratio to 1.54/1 and the nitrogen to ammonia ratio to 1.86/1 and increasing the reaction time to 0.29 second, with the same maximum temperature of 1450° C., the hydrocyanic acid yield based on the inlet ammonia remains substantially the same.

With a 2.65/1 ratio of methane to ammonia, a 2.2/1 ratio of nitrogen to ammonia, a reaction time of 0.14 and a maximum temperature of 1450° C., a yield of almost 85% hydrocyanic acid based on the inlet ammonia is obtained.

*Example 2.*—Employing the apparatus of Example 1, through the annular space between the alundum reaction tube and thermocouple well a mixture of 2.80 volumes of methane, 2.22 volumes of hydrogen and 1 volume of ammonia is passed and is heated to a temperature of 1438° C. with a reaction time of 0.16 second at temperatures above 1200° C. Under these conditions a yield of hydrogen cyanide of 86.2% was obtained.

Increasing the temperature to 1495° C. with a reaction time of 0.154 second, a mixture of 2.77 volumes of methane, 2.22 volumes of hydrogen and 1 volume of ammonia gave a yield of hydrogen cyanide of 85.3%. Increasing the temperature to 1554° C. with a reaction time of 0.152 second, a mixture of 2.76 volumes of methane, 2.14 volumes of hydrogen and 1 volume of ammonia gave a yield of hydrogen cyanide of 35.6%.

*Example 3.*—A refractory tube of alundum 22 mm. internal diameter is provided with a thermocouple well 17 mm. external diameter inserted from one end of the tube and with an alundum gas supply tube ending in a burner tip of porous alundum inserted in the other end of the refractory tube so that the burner tip is within half an inch of the end of the thermocouple well. Methane, ammonia and air are supplied to the burner where they are ignited and combustion of a part of the methane with the air takes place. The resulting gases then pass through the annular space between the thermocouple well and the refractory tube through a section of the tube which is heated in a furnace and serves as a high temperature reactor in which the gases attain a maximum temperature of 1450° C. The inlet gases are supplied in the proportions of 2.7 volumes methane and 2.7 volumes air to 1 volume ammonia at a rate such that their time of passage through the reaction zone at temperatures of 1200° C. and higher is 0.15–0.16 second. Substantially all the ammonia is decomposed and the yield of hydrocyanic acid based on the inlet ammonia is over 80%.

In the process of this example about 0.35 volume of methane is required for combustion with the air to form carbon monoxide and water, leaving a ratio of 2.35 volumes methane for reaction with every 1 volume of ammonia.

The accompanying drawings diagrammatically illustrate apparatus and procedures for carrying out processes embodying my invention on a large scale. Fig. 1 illustrates a continuously operating process in which the heat required for maintaining the reaction gases at the desired temperature is supplied from hot products of combustion passed in indirect heat exchange with the reaction gases. Fig. 2 illustrates an intermittent, heat-regenerative process wherein the heat is supplied to the reacting gases from previously heated refractory material.

With reference to Fig. 1, a combined reactor and preheater 50 has the following construction: A nest of alundum tubes 51 with their tops opening into an exit gas header 52 and their bottoms opening into an inlet gas header 53, form a tube nest within a shell 54 through which hot combustion gases from a burner 55 may be circulated about the exterior of tubes 51 and out through a vent gas exit 56. The hottest combustion products pass around the upper portions of tubes 51 heating gas passing through the tubes to high reaction temperatures and then, flowing in a generally downward direction through the space within shell 54, preheat the gas passing upwardly through the lower portions of refractory tubes 51. Thus, the space within the upper portion of the refractory tubes serves as a high temperature reaction zone while that in the lower portions of the tubes serves as a preheating zone for gas entering from header 53. Alundum thermocouple wells 57 are inserted into the upper portions of tubes 51 so that the reaction zone in the apparatus is the annular spaces between the exterior of the thermocouple wells and the interior surfaces of tubes 51. Thermocouples inserted in the wells serve to determine the temperatures prevailing in the gas within the tubes and permit of suitable control of this reaction condition. While the thermocouple wells shown in the drawing all terminate in a closed end at a midportion of tubes 51, some or all the thermocouple wells may be extended downwardly through the preheater section of the tubes in order to determine the temperatures in the preheater section for ease of control of the process. A blower 58 serves to force a reaction gas into inlet header 53, through tubes 51 to outlet header 52, thence through outlet pipe 59 to the bottom of an absorption tower 60 and upwardly through this tower. Tower 60 is provided with a water spray head 61 from which water is distributed over a packing in the tower over which the water flows downwardly in intimate contact with the gases passing upwardly through the tower. The water with material absorbed from the gases leaves the bottom of the tower through a pipe 62. The gases after thus being washed with the water pass out of the top of the tower through exit pipe 63.

Burner 55 is provided with an air inlet 64 and a fuel gas inlet 65. A blower 66 draws combustible gas from exit 63 of tower 60 and also from a valve-controlled pipe 67 through which supplemental fuel gas may be supplied and supplies these gases to the burner. A blower 58 also communicates through a valve-controlled connection 68 with pipe 63 and through a valve-controlled inlet pipe 69 with sources of methane and ammonia gases.

In order not to complicate the drawing, usual engineering features of a plant embodying the construction described above have been omitted such as gas storage vessels floating on the pipe line leading from the reactor to the absorption tower and on the gas exit pipe line leading from the top of absorption tower 60. As is well known, such gas storage capacity facilitates operation of a process of the type illustrated in the drawing.

Employing the above described apparatus for carrying out a process embodying my invention, the reactor and preheater are heated up by combustion products from burner 55 where supplemental fuel gas from pipe 67 is burned with air from pipe 64. A mixture of methane and ammonia initially diluted with hydrogen gas is drawn from pipe 69 by blower 58 and passed upwardly through the preheating and reaction spaces in tubes 51. In the reaction space the methane and ammonia react to form a gaseous reaction product containing hydrocyanic acid, hydrogen, nitrogen and hydrocarbons. This reaction product is washed with water in adsorption tower 60 to absorb the hydrocyanic acid, which is withdrawn as an aqueous HCN solution from the bottom of the tower through pipe 62. The unabsorbed gases (the tail gas) from absorption tower 60, are in part returned through pipe 63 and connection 68 and mixed with the incoming methane-ammonia gases to replace the hydrogen initially used as a diluent in starting up the process. Another portion of the tail gas is drawn from pipe 63 by blower 66 to replace supplemental fuel gas initially supplied to burner 55. When a steady state of operation is attained, depending upon the proportion of methane to ammonia supplied from pipe 69, the tail gas may be employed to supply all or any desired portion of the fuel required for maintaining the desired temperatures in the reactor. With a large ratio of methane to ammonia entering the process an excess of tail gas over that required for maintaining reaction temperatures may be produced which excess would then be withdrawn through excess gas draw-off 70. An undesired accumulation of nitrogen or oxides of carbon (the latter being formed in the system from water carried by the tail gas from absorption tower 60 and water incidentally entering with the materials supplied or from leakage of air into the system), is prevented by venting gas from the system through vent gas outlet 56 and through excess gas draw-off 70, when gas is taken out here.

Specific conditions maintained in operating this continuous process are suitably as follows: methane and ammonia are introduced and mixed with tail gas in proportions such that the resulting mixture passed to the reactor-preheater contains substantially 2.6 volumes of methane and substantially 2.4 volumes of total hydrogen and nitrogen for every 1 volume of ammonia. The tail gas itself will contain of the order of 90% hydrogen so that as a diluent the tail gas acts essentially the same as pure hydrogen. The gaseous reaction mixture is heated in the annular reaction spaces within the upper portions of tubes 51 to a maximum temperature of 1450° C. and is passed through the reaction space where the temperatures are above 1200° C. at a rate such that the reaction time at these temperatures is substantially 0.16 second. Under these conditions of operation the yield of hydrocyanic acid in the gases in the gaseous reaction products is about 85%.

The use of tail gas, which is substantially composed of hydrogen, or of pure hydrogen as a diluent for the methane and ammonia in carrying out my process, has an important advantage in that the hydrogen minimizes the formation of amorphous carbon at the high reaction temperatures. Amorphous carbon tends to plug up the reactor and to be carried along with the product gases to foul the absorption tower and the hydrocyanic acid solution recovered therefrom. The use of hydrogen as a diluent in the gaseous reaction mixture further influences the nature of that carbon which is formed, in that it tends to deposit as a graphitic type of carbon on the surfaces of the reactor. Such a deposit improves the operation of the process. An increase in yield of hydrocyanic acid has been noted when the alundum surfaces have become coated with a gray (graphitic) carbon deposit. When, after a long period of operation, carbon deposited on the reactor surfaces may build up enough to unduly restrict the free space in the reaction zone, this carbon may be burned off by passing air through the hot reactor, after which the described operations for production of hydrocyanic acid may be resumed.

As pointed out above, another method of operating my process is one in which heat regeneration is employed, also with recirculation of tail gases to provide diluent gases for the reaction mixture. Such a process is illustrated in Fig. 2 of the accompanying drawings, in which 1 designates a combined reaction chamber and dual heat regenerator, all in a suitable housing 2 of heat-resistant and heat-insulating material, to confine heat within reaction chamber 3 and heat regenerators 4 and 5. Each of the reaction chamber and heat regenerators is divided into two sections by a partition 6, 7 and 8, respectively, extending from the top 9 of the housing containing the reaction chamber and heat regenerators to a short distance above the bottoms of the reaction chamber and heat regenerators, leaving a passageway below each partition for gases to pass from one section to the other of the reaction chamber and heat regenerators. The bottom of reaction chamber 3 is provided with a burner 14 for a fluid fuel from which the hot burning gases are ejected into the space below partition 6 and walls 10. Suitable air and fuel supply lines for this burner are indicated in the drawing.

Reaction chamber 3 contains refractory brickwork arranged in the form of walls 10 transversing the reaction chamber in a direction perpendicular to the cross section shown in the drawing. This arrangement provides narrow, parallel slots 11 between the walls and between partition 6 and portions of housing 2 and the adjacent walls. These slots serve as gas passages through the reaction chamber.

The particular construction shown in which the walls extend parallel to each other from the top to near the bottom of the reaction chamber is not essential. Instead of the walls extending throughout parallel to each other, a series of shorter walls may be arranged in vertically alternating sections, of which the walls of adjacent sections run at right angles to each other. Other arrangements of the refractory material in the reaction chamber may be employed which provide narrow passageways about 2–5 mm. thick for gases passing through the chamber in contact with the refractory surfaces.

In the drawing the heat regenerators are similarly shown with a refractory packing arranged in the form of walls 12 defining narrow slots 13 for passage therethrough of gases. Since the function of these heat regenerators is to transfer heat to or from the gases, their packing may be arranged in any of the numerous known methods for packing this type of heat regenerator.

Alundum is a suitable refractory material for walls 10 and 12 and also for the interior surfaces of housing 2 with which the gases come into contact.

The drawing shows two gas storage tanks, storage tank 15 for product gas and storage tank 16 for tail gas. This tail gas is obtained by scrubbing product gas in water scrubber 17 with a countercurrent flow of cold water introduced through a pipe 18 to the top of the water scrubber. The resulting aqueous solution of hydrocyanic acid flows from the bottom of the scrubber through pipe 19.

The several units of apparatus which have been described are interconnected with suitable gas piping shown in the drawing, which will be described in connection with the following description of a process for producing hydrocyanic acid.

*Heating cycle I.*—In starting operations with the apparatus cold, a fuel is burned by means of burner 14 at the bottom of reaction chamber 3. With valves 20, 21, 23, 29, 30, 37, 38, 40 and 41 closed and valves 22 and 24 open, the hot burning gases and combustion products pass upwardly through the right-hand section of the reaction chamber, thence first downwardly through one section and then upwardly through the other section of heat regenerator 5 to pipe 25 connected to the top of this heat regenerator, thence through valve 22 to pipe 27, through valve 24 and out through waste gas exist pipe 28.

*Coating cycle II.*—When the refractory in the bottom portion of reaction chamber 3 has been heated to a suitably high temperature, the flow of fuel and air to burner 14 is stopped, valve 24 is closed and valve 41 is opened. Valve 29 is opened. Methane, suitably supplied in the form of natural gas, mixed with hydrogen, is introduced through pipe 31, passes through pipe 27, valve 22, pipe 25 to and through heat regenerator 5, and thence through the reaction chamber 3 and heat regenerator 4, valve 41 and pipe 39 to tail gas storage tank 16. By thus passing a mixture of methane diluted with an equal or greater quantity of hydrogen through the hot reaction chamber the methane is in part cracked depositing carbon on the walls of the reaction chamber in the form of a coating which greatly increases the yields of hydrocyanic acid during the subsequent reaction cycle.

*Reaction cycle III.*—When the refractory surfaces in the reaction chamber have been suitably coated with carbon, valve 37 is opened and ammonia admitted to the gases passing from heat regenerator 5 to reaction chamber 3. The methane-hydrogen gas mixture which has been preheated in heat regenerator 5 and to which ammonia has been added passes into the top of reaction chamber 3 and through the narrow passageways between the hot refractory in this chamber. It is here heated to temperatures at which the ammonia and methane react to form hydrocyanic acid. From the reaction chamber the hot reaction products pass through heat regenerator 4 where they give up heat to the cooler refractory in this heat regenerator before leaving through pipe 26, valve 21 and pipe 33 which conveys the product gases into storage tank 15. The direction of gas flows during this cycle is shown by the arrows in solid lines.

*Heating cycle IV.*—When the temperatures of the refractory in reaction chamber 3 have fallen below suitable temperatures for heating the reaction mixture of methane and ammonia, valves 29, 37, 22, 21 and 41 are closed, valves 23 and 24 are opened and fuel and air are again supplied to burner 14 to heat the refractory in chamber 3. The combustion products now pass upwardly through the left-hand section of chamber 3, through heat regerenator 4, pipe 26, valve 23, pipe 27 and valve 24 to waste gas exit pipe 28.

*Coating cycle V.*—When the refractory in chamber 3 has thus been reheated, the supply of fuel and air is cut off, valve 24 is closed and valve 40 is opened. The mixture of methane and hydrogen is admitted from pipe 31 to pipe 27 and thence passes through heat regenerator 4, reaction chamber 3 and heat regenerator 5. From the latter the gas passes through valve 40 to pipe 39 and tail gas storage tank 16.

*Reaction cycle VI.*—When reaction chamber 3 has been suitably coated with carbon, valve 40 is closed and valve 20 opened. Valve 33 is opened to admit ammonia gas which mixes with the preheated methane and hydrogen gas passing from heat regenerator 4 to reaction chamber 3, where it is heated to the desired reaction temperature of the ammonia and methane to form hydrocyanic acid. The product gas then passes through heat regenerator 5, giving up heat to the refractory in this regenerator. From regenerator 5 the product gas passes through pipe 25, valve 20 and pipe 33 to storage tank 15. Gas flows during this cycle are shown by arrows in broken lines.

By operating the described sequence of heating, coating and reaction cycles, repeating the sequence as necessary, reaction product gas is prepared and stored in gas storage tank 15.

Gas is drawn from storage tank 15 and passed to the bottom of and thence upwardly through water scrubber 17. Cold water admitted through pipe 18 flows downwardly in scrubber 17 in intimate contact with the gas passing therethrough and absorbs the hydrocyanic acid from that gas. The resulting aqueous hydrocyanic acid solution leaves through pipe 19. This solution may be heated, preferably under reduced pressure, to evolve the hydrocyanic acid which may be condensed and redistilled to obtain a purified product. The unabsorbed tail gases leaving the top of water scrubber 17 pass to storage tank 16. These tail gases principally consist of hydrogen and methane which has not reacted during its passage through reactor 3. They contain small amounts of nitrogen and other constituents, but hydrogen constitutes about 90% of the constituents of the tail gas other than hydrocarbons.

The foregoing preliminary operations serve to heat the reactor and heat regenerators to suitable temperatures and to accumulate in gas storage tank 16 a supply of tail gas for mixing with the methane and ammonia to be treated in accordance with the preferred method of carrying out my invention.

Assuming preliminary operation described above ended with a reaction cycle III, reaction chamber 3 is heated by means of burner 14 until the bottom portion of the refractory in the chamber is at 1500° C. During this heating step the combustion products pass from reaction chamber 3 to regenerator 4 and thence to waste gas exit 28. This heating cycle is followed by a coating cycle in which methane gas is admitted from pipe 31 and tail gas from pipe 32 in the proportions of 1 volume methane for every 1 volume total hydrogen and nitrogen in the tail gas. This mixture of gases is passed through regenerator 4, reactor 3 and out through regenerator 5 at a rate such that the average resident time of gas in the reaction chamber at temperatures above 1200° C. is substantially 0.18 second. At the high temperatures in the reaction chamber a coating of carbon derived from the methane is deposited on the refractory surfaces. From regenerator 5 the tail gas returns through valve 40 and pipe 39 to tail gas storage tank 16. Ammonia is then admitted from pipe 38 to the gases passing from regenerator 4 to the reaction chamber to provide 1 volume of ammonia for every 2½ volumes methane and 2½ volumes total hydrogen plus nitrogen. In this reaction cycle the mixture of methane and tail gas passing through regenerator 4 is preheated to about 1000° C. Ammonia admitted through valve 38 mixes with the thus preheated gases and the reaction mixture thus obtained passes through reaction chamber 3. The product gas passes out through heat regenerator 5 to gas storage tank 15. The rate of flow of the total methane gas, tail gas and ammonia is such as will provide a reaction time of 0.15 second in the portion of reaction chamber 3 in which the gases are at temperatures in the range 1200° C. to 1500° C.

When the temperatures in reaction chamber 3 have fallen to a point at which the maximum gas temperature in the chamber is about 1450° C., the flow of methane, ammonia and tail gas is shut off and the reaction chamber is again heated to 1500° C. by means of burner 14, with the combustion products now passing through heat regenerator 5 and thence to waste gas exit 28. This heating cycle is succeeded by a coating and a reaction cycle in which the methane and tail gas are introduced first to heat regenerator 5 and thence pass, with ammonia admitted during the reaction cycle, through reaction chamber 3, heat regenerator 4 and pipe 39 to storage tank 16 or pipe 33 to storage tank 15 during the coating and reaction cycle, respectively.

While the timing of the several cycles in this process will depend upon the particular construction of the heat regenerators and reactor employed, the following is representative of suitable relative times for the several cycles:

| | Minutes |
|---|---|
| Heating cycle | 3 |
| Coating cycle | 1 |
| Reaction cycle | 2 |

Merely for convenience of operation the rates of passing the methane and hydrogen or tail gas to the reactor during the coating period are the same as the rates at which these gases are introduced during the following make period. However, both the rate of passage of the methane and hydrogen and the duration of the coating cycle may be widely varied and the surfaces in the reactor be suitably conditioned for high yields of hydrocyanic acid during a subsequent reaction cycle. For example, with the above-described rates of flow of methane and hydrogen, a 15 second coating period has been found to suitably condition the reactor. This same objective also has been accomplished by a 1 minute cycle with the rates of flow of the methane and hydrogen decreased to one-fourth that described above. Accordingly, the rate of flow of the gas and the duration of the coating cycle are largely governed by the mechanical operation of a particular plant.

I would particularly point out that deposition of carbon on the walls of the reactor takes place during the reaction period when the methane, hydrogen and ammonia mixture is supplied to the reaction chamber. In an intermittent, heat-regenerative process in which the carbon is burned off the reactor surfaces during the heating-up period, without a coating cycle the initial yields of hydrocyanic acid during a reaction cycle would be low. For the necessarily short reaction cycle in this type of operation, this would materially reduce the overall yields of hydrocyanic acid based on the ammonia. By conditioning the reaction chamber during a coating cycle, initial low yields during the subsequent reaction cycle are obviated and overall high yields of hydrocyanic acid are obtained. In a continuously operating, indirect heat transfer process, such as described above, an initial conditioning period of operation is so short relative to the entire period of reaction that low yields of hydrocyanic acid during the initial period are insignificant with respect to the overall yields of the process.

As the operation of this process continues there is a continuous accumulation of tail gas over and above that required for dilution of the methane-ammonia reaction mixture. This tail gas is withdrawn through valve 36 and pipe 35. It may be used as fuel burned in burner 14 for heating reaction chamber 3 or withdrawing through vent pipe 42.

I claim:

In a non-catalytic heat-regenerative process for reacting methane and ammonia to form hydrocyanic acid wherein a body of solid refractory material is heated by hot products of combustion and a gaseous mixture of the methane and ammonia is thereafter passed in contact with the hot refractory to heat the mixture to temperatures at which the ammonia and methane react to form hydrocyanic acid, the improvement which comprises heating the refractory to temperatures above 1425° C., then passing in contact with the heated refractory a gaseous mixture containing methane and hydrogen with the amount of hydrogen at least equal to that of the methane whereby a coating of carbon is deposited on the surface of the hot refractory and thereafter admitting ammonia to contact with said refractory and passing in contact with the hot coated refractory a reaction mixture containing ammonia 1.3 to 3.0 volumes of methane for every 1 volume of ammonia and a total of 2 to 9 volumes of hydrogen plus nitrogen for every 1 volume of ammonia, and heating said reaction mixture by contact with the hot refractory to a temperature of at least 1425° C. for a reaction period during which the reaction mixture is at temperatures above 1200° C. of 0.15 to 0.3 second.

References Cited in the file of this patent

UNITED STATES PATENTS

| Number | Name | Date |
|---|---|---|
| 1,050,978 | Moscicki et al. | Jan. 21, 1913 |
| 1,387,170 | Poindexter | Aug. 9, 1921 |
| 2,069,545 | Carlisle et al. | Feb. 2, 1937 |
| 2,106,137 | Reed | Jan. 18, 1938 |
| 2,184,062 | Harris | Dec. 19, 1939 |
| 2,596,421 | McKinnis | May 13, 1952 |

FOREIGN PATENTS

| Number | Country | Date |
|---|---|---|
| 353,407 | Great Britain | July 21, 1931 |